United States Patent
Houston et al.

(10) Patent No.: US 7,765,284 B2
(45) Date of Patent: Jul. 27, 2010

(54) DYNAMICALLY MODIFIED, MULTIPLE-PLATFORM COMPUTER PROGRAMS, AND METHODS AND APPARATUS UTILIZING SAME

(75) Inventors: Edward Donald Houston, Roseville, CA (US); Paulene M. Purdy, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2208 days.

(21) Appl. No.: 10/279,531

(22) Filed: Oct. 24, 2002

(65) Prior Publication Data
US 2004/0083280 A1 Apr. 29, 2004

(51) Int. Cl.
*G06F 15/177* (2006.01)
(52) U.S. Cl. ............................ 709/221; 709/208
(58) Field of Classification Search ................ 709/201, 709/203, 216, 217, 219, 223, 208, 221; 707/1, 707/3, 10
See application file for complete search history.

(56) References Cited

U.S. PATENT DOCUMENTS

| | | | | |
|---|---|---|---|---|
| 5,392,386 A | * | 2/1995 | Chalas | 715/841 |
| 5,734,589 A | * | 3/1998 | Kostreski et al. | 715/716 |
| 6,332,180 B1 | * | 12/2001 | Kauffman et al. | 711/153 |
| 6,332,219 B1 | * | 12/2001 | Curtis et al. | 717/170 |
| 6,367,072 B1 | * | 4/2002 | Justice et al. | 717/168 |
| 6,633,916 B2 | * | 10/2003 | Kauffman | 709/229 |
| 6,718,546 B1 | * | 4/2004 | Johnson | 717/169 |
| 6,754,889 B1 | * | 6/2004 | Leverenz | 717/127 |
| 6,865,679 B1 | * | 3/2005 | Dennison | 726/21 |
| 6,915,524 B2 | * | 7/2005 | Crowley et al. | 719/321 |
| 6,934,834 B2 | * | 8/2005 | Melin et al. | 713/2 |
| 2004/0117338 A1 | * | 6/2004 | Kennedy et al. | 707/1 |
| 2008/0313282 A1 | * | 12/2008 | Warila et al. | 709/206 |

* cited by examiner

*Primary Examiner*—Shawki S Ismail

(57) ABSTRACT

A method for operating a computer having an operating system platform and a virtual machine configured to interpret an instruction language, the computer also having a client program written in the instruction language. The method includes using the client program to determine the operating system platform and modifying operation of the client program in accordance with the determination. The method is particularly useful for operation of a client program running on a computer that controls a storage area network management server.

22 Claims, 6 Drawing Sheets

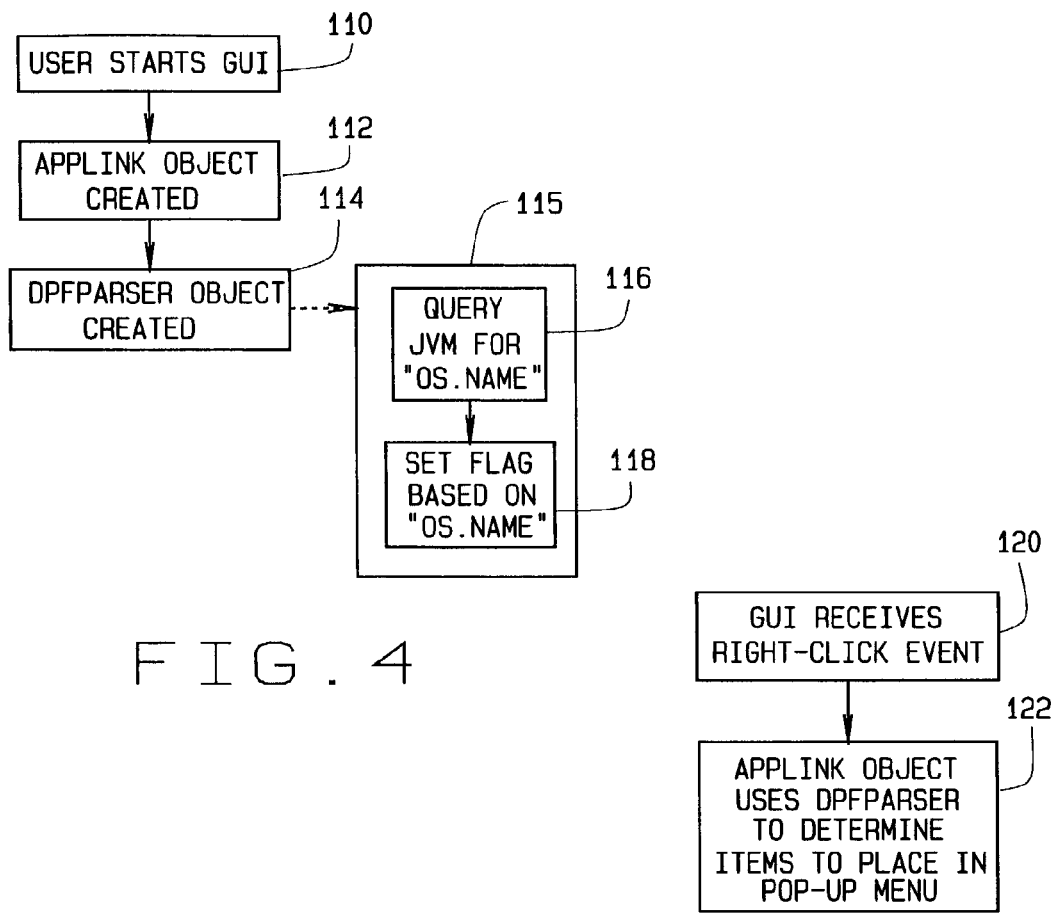
FIG. 4
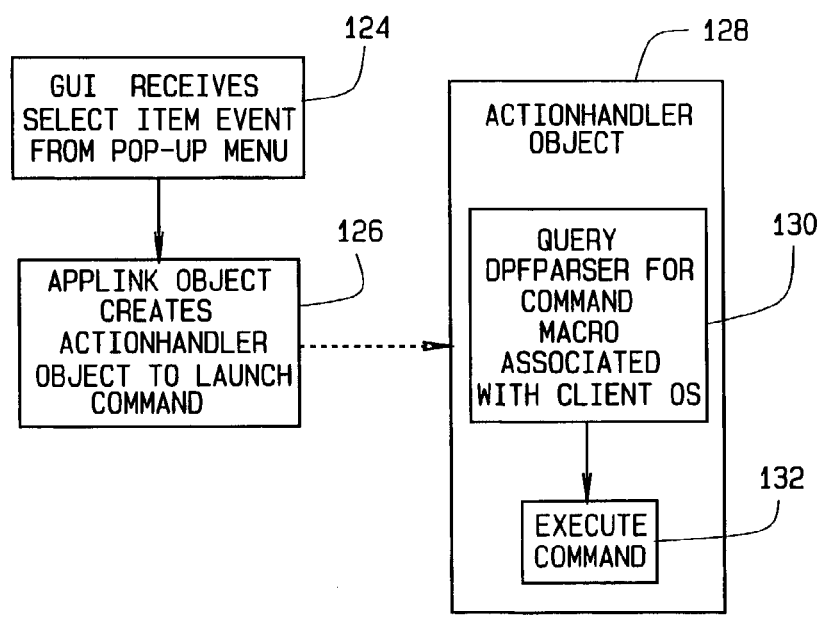
FIG. 6
FIG. 7

```
HOST.DEF+ (C:\SANMGR\MANAGEMENTSERVER\DEVICES\PROPERTIES) -GVIM

# THIS PROPERTY FILE IS PROVIDED SO THAT ONMANGE COMMANDS MAY
# BE ADDED TO THE MENU FOR HOSTS WITH AGENTS

NAME:         HOST
VERSION:      0.300.A
ALIAS:        HOST
VENDOR:       HOST
PARTNUMBER:
FAMILY:       HOST
TYPE:         HOST
ICON:         HOST

# DEVICE MANAGEMENT
ONMANAGE:         %BROWSER %HOME/DEVICES/PROPERTIES/HOST.HTML
ONMANGE-WIN:      CMD.EXE /C START TELNET.EXE %IP_ADDRESS
ONMANAGE-HPUX:    /USR/BIN/X11/HPTERM -E /USR/BIN/TELNET %IP ADDRESS:  /USR/BIN/X11/HPTERM
                  -E /USER/SBIN/PING %IP_ADDRESS
ONMANAGE-SOL:     /USR/OPENWIN/BIN/XTERM -E /USR/BIN/TELNET %IP_ADDRESS
ONMANAGE-LNX:     /USR/BIN/X11/XTERM -E /USR/BIN/TELNET %IP_ADDRESS

ONMANAGENAME:       HOST TELNET RELEASE NOTES
ONMANAGENAME-WIN:   TELNET
ONMANAGENAME-HPUX:  TELNET; PING
ONMANAGENAME-SOL:   TELNET
ONMANAGENAME-LNX:   TELNET

# STATUS
TARGET: SNMP|%IP_ADDRESS
DEVICECLASS:
```

FIG. 5

DYNAMICALLY MODIFIED, MULTIPLE-PLATFORM COMPUTER PROGRAMS, AND METHODS AND APPARATUS UTILIZING SAME

FIELD OF THE INVENTION

The present invention relates to methods and apparatus for controlling a computer system, such as a storage area network, utilizing a computer program written for multiple operating system platforms.

BACKGROUND OF THE INVENTION

In various configurations of Storage Area Networks (SANs), server networks are connected with software to allow servers to share storage on common storage devices, thereby creating one or more storage pools. To provide the ability to manage SANs, Storage Area Management (SAM) software exists that provides comprehensive, centralized management of storage networks. One example of such software provides a suite of tools including a storage node manager, a storage accountant, a storage allocator, a storage builder and a storage optimizer.

Management of a SAN is performed in some instances via a graphical user interface (GUI) client running on a remote computer and communicating via a network or other communication link with a management server running on a different computer. The client computer may provide one of several operating system platforms such as the HP-UX® operating system (available from Hewlett-Packard Company, Palo Alto, Calif.), the LINUX® operating system (LINUX is a trademark of Linus Torvalds, San Jose, Calif.), the SOLARIS® operating system (available from Sun Microsystems, Inc., Palo Alto, Calif.), or any of the various versions and releases of the MICROSOFT® WINDOWS® operating systems (available from Microsoft Corporation, Redmond, Wash.), such as 95, 98, ME, NT, 2000, or XP. At least one known GUI client is a JAVA®-based client that can run on these various operating systems. This client uses a JAVA® virtual machine (JVM™) such as that available from Sun Microsystems, Inc., Palo Alto, Calif., to provide a menu of device management applications that can be invoked by mouse clicks. Some of these device management applications must be launched by invoking commands that differ on different operating systems. Thus, multiple links have been provided on menus accessed via a mouse click. Each link has included a descriptive name that would allow a user to differentiate between commands for each operating system (e.g., "Telnet (Windows)" or "Telnet (HP-UX)").

This method of accommodating different command invocations on operating systems relies upon the user to select the right choice for the client operating system. Furthermore, scalability may become a problem if there is a need to support additional operating systems, and menus may become crowded with commands that a user may never need or be able to use.

SUMMARY OF THE INVENTION

Some configurations of the present invention therefore provide a computer having an operating system platform and a virtual machine configured to interpret an instruction language. The computer also has a client program written in the instruction language. The client program also has instructions written in the instruction language that are configured to determine the operating system platform and to modify the operation of the client program in accordance with the determination.

Some configurations of the present invention provide a management system. The management system includes a management server computer having a management server program with instructions configured to instruct the management server computer to communicate with devices in a storage area network; a plurality of client computers, each having an operating system platform but not all having the same operating system platform, wherein each client computer also has a virtual machine configured to interpret the same language code as each other client computer, and a client program written in the virtual machine language and including instructions configured to instruct the client computer to communicate with the management server computer; wherein the client program includes instructions to determine the operating system platform of its client computer and to modify the operation of the client program in accordance with the determination.

In some configurations of the present invention, there is provided a method for operating a computer having an operating system platform and a virtual machine configured to interpret an instruction language, the computer also having a client program written in the instruction language and having instructions to communicate with a server. The method includes using the client program to determine the operating system platform and modifying operation of the client program in accordance with the determination.

Also, some configurations of the present invention provide a machine-readable medium or media having recorded thereon instructions interpretable by a virtual machine. The instructions are configured to instruct a computer having an operating system platform to determine the operating system platform of the computer, and determine a menu of items to display on a display of the computer in response to a user input, wherein the determination of menu items is dependent upon the operating system platform determination.

It will be seen that methods and apparatus of the present invention accommodate different command invocations on operating systems without relying upon the user to select the right choice for the client operating system. Furthermore, methods and apparatus of the present invention provide scalability if there is a need to support additional operating systems, without crowding menus with commands that a user may never need or be able to use.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a flow chart showing steps taken and objects created by various client program configurations of the present invention upon a user starting the client program graphical user interface (GUI).

FIG. 5 is a representation of a listing of a specification file.

FIG. 6 is a flow chart showing steps taken by various client program configurations of the present invention upon a user event that creates a menu of user items, including platform specific commands or links.

FIG. 7 is a flow chart showing steps taken by various client program configurations of the present invention upon a user action to launch a platform specific command or link.

DETAILED DESCRIPTION OF THE PREFERRED EMBODIMENTS

The following description of the preferred embodiment(s) is merely exemplary in nature and is in no way intended to limit the invention, its application, or uses.

Figure 1:
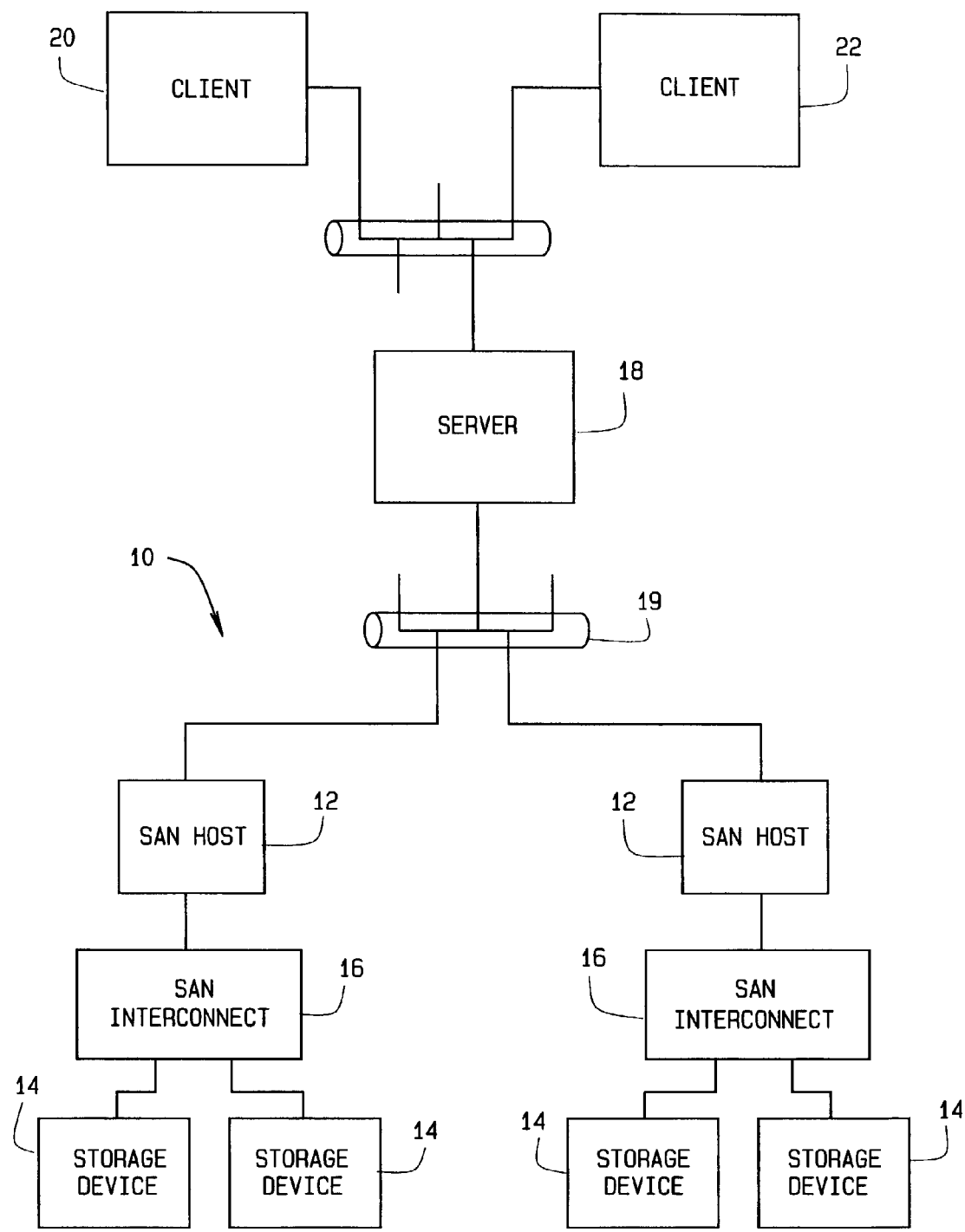
FIG. 1 is a block diagram representative of various configurations of the present invention as used in or in conjunction with a storage area network (SAN).

Although the present invention may be used in conjunction with many types of computers and computer networks, many configurations of the present invention are utilized in conjunction with storage area networks (SANs). In some configurations and referring to FIG. 1, a storage area network (SAN) 10 comprises at least one SAN host computer or storage device controller 12, one or more associated storage devices 14, and may also include one or more SAN interconnect devices 16, such as a Fibrechannel switch.

SAN 10 further comprises a management server 18, which in many configurations is a process running on a separate computer from the one or more SAN hosts 12. For example, in some configurations, management server 18 is a process executing on a computer running the Windows 2000 operating system platform. In some configurations of the present invention (but not those represented by FIG. 1), management server 18 runs on a host computer 12 of SAN 10 and does not require a separate computer or processor. (Unless otherwise noted, the terms "management server" and "server" shall hereinafter encompass server processes irrespective of on which computer the process is running.) An Ethernet or Fibrechannel network 19 provides a communication path between the computer running management server process 18 and the SAN host or hosts 12. An Ethernet or Fibrechannel network may also be used for other interconnections in SAN 10. Management server 18 is configured to perform a plurality of functions, such as discovery and mapping of SAN 10 resources (hosts, interconnections, and devices such as bridges, tapes, disks, and other storage devices), and classification of resources and the association of these resources with property files.

SAN 10 is remotely managed by one or more instances of management clients 20 and 22, which are processes running on computers that communicate with management server 18 via one or more communication links 24, 26, such as an Ethernet LAN, a WAN, a dial-up connection, or the Internet. Each management client 20 and 22 provides graphical user interface-based (GUI-based) access to one or more of functions made available by management server 18, as well as functions for controlling devices such as hosts 12 in SAN 10.

Figure 2:
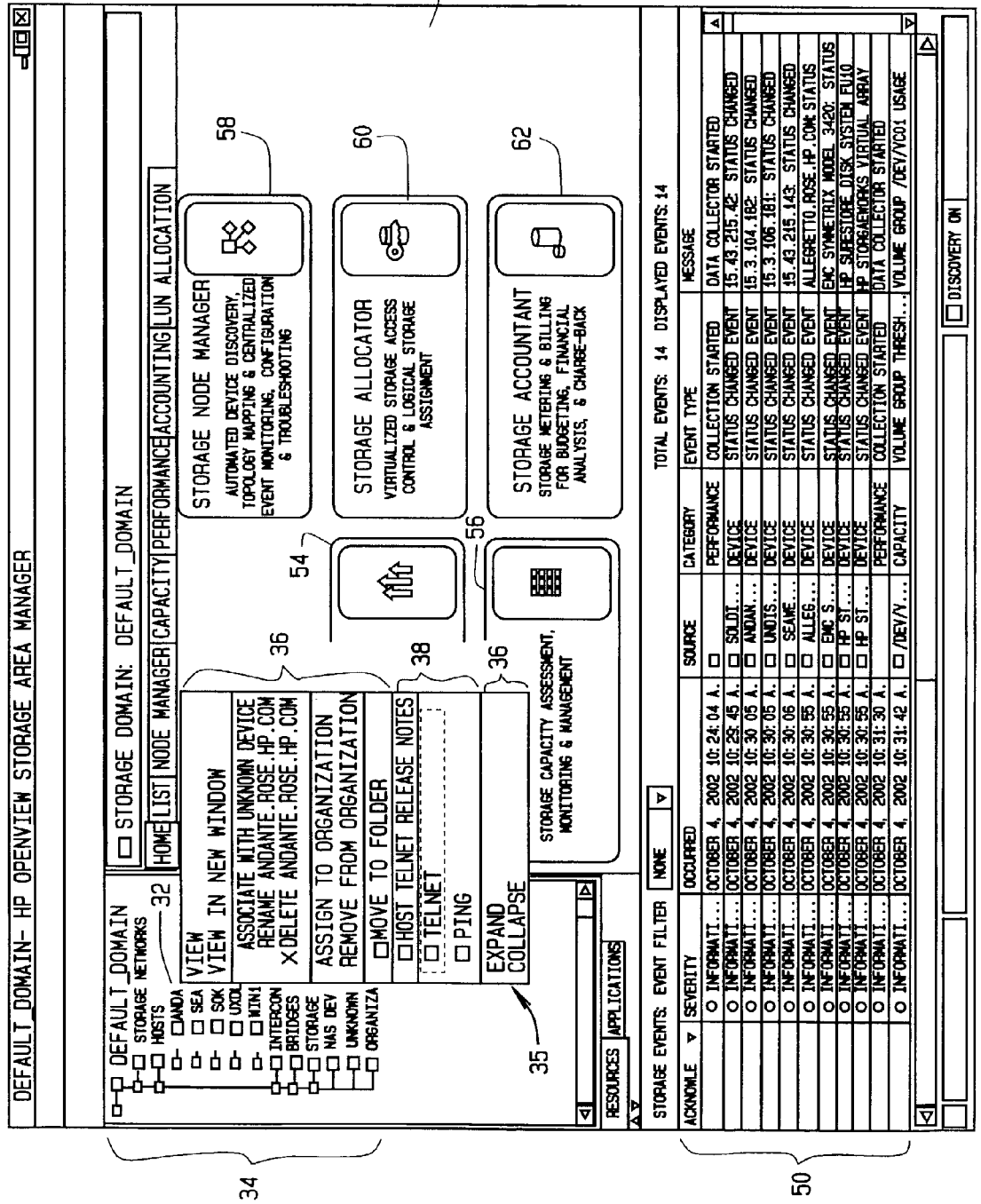
FIG. 2 is a representative client display produced by a client program running on a computer providing an HP-UX or LINUX operating system platform.
Figure 3:
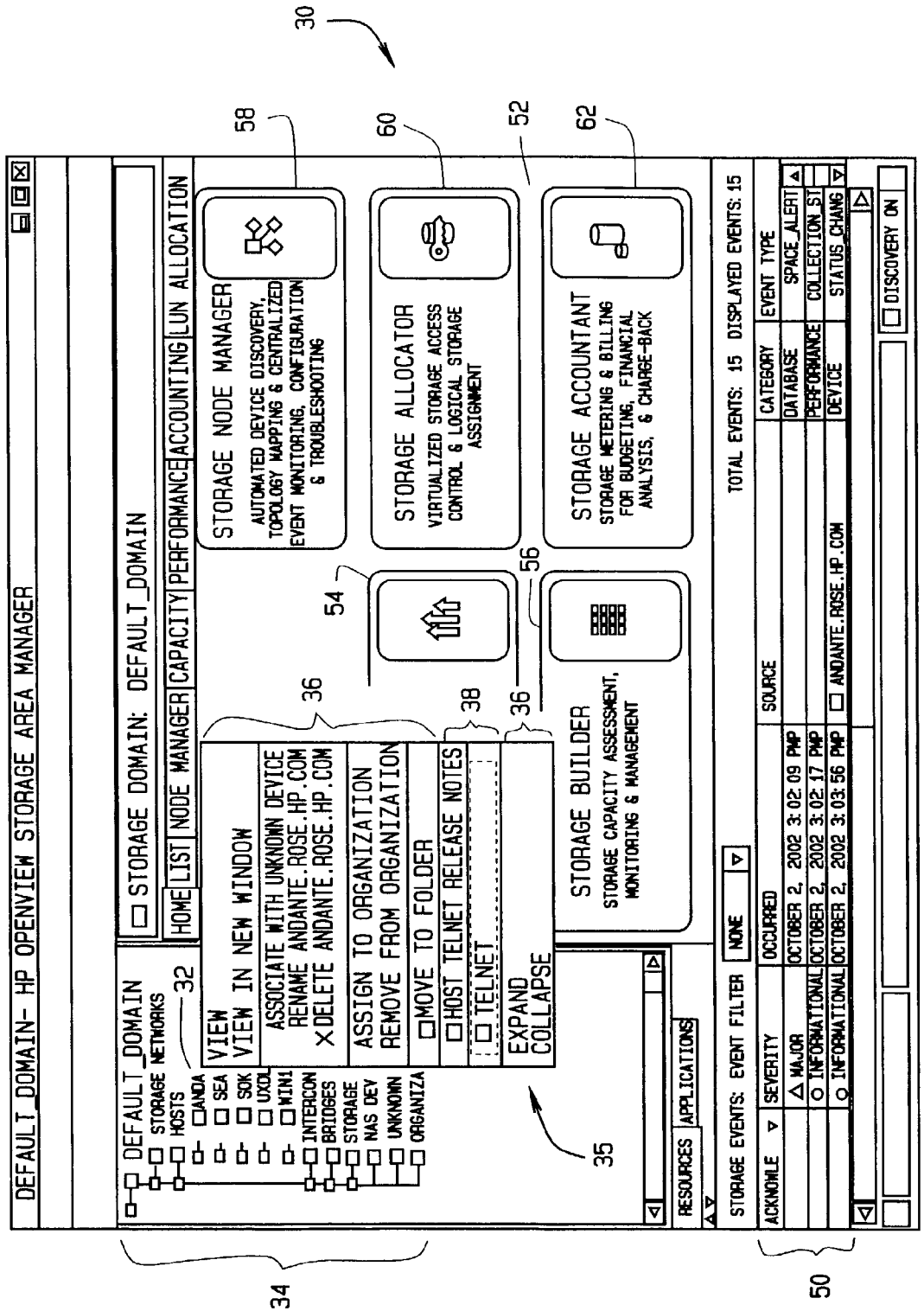
FIG. 3 is a representative client display produced by a client program running on a computer providing a WINDOWS 2000 operating system platform.

Management clients 20 and 22 are software processes running on operating system platforms on their respective computers. In some configurations, management client software is provided in the form of a program written in an interpreted language that executes utilizing a "virtual machine," i.e., a software program that interprets instructions of the language and mimics the results that would occur if the instructions were executed on processor hardware designed to execute that language. Standard function libraries are provided interface between hardware controlled by the operating system and the virtual machine. For example and referring to FIGS. 2 and 3, standard functions allow a program written in one language to use the same instructions to produce similar results on a window manager of an HP-UX or Linux workstation, such as display 28, and on a Windows 2000 workstation, such as display 30.

Each management client 20, 22 provides platform independent links or commands and platform specific links or commands. Platform independent links or commands can be written in the language in which the client program is written. Such commands include, but are not limited to commands that are issued to management server 18 or that manipulate and display data about SAN 10 that is communicated by management server 18 to client 20 or 22, or commands that control client 20 or 22, itself. Platform specific links or commands include commands that rely upon native operating system functions or are provided as separate programs from client 20 or 22, and in general, may include programs already resident in the client computer. Examples of platform specific links or commands include, but are not limited to, "telnet" and "ping." For example, referring to FIGS. 2 and 3, when a user clicks the right mouse button on a host computer icon (such as icon 32) in a displayed tree 34 of networked devices (e.g., 12, 14, and 16) in a storage network 10, a pop-up menu 35 appears. For example, GUI SAM clients 20 and 22 are clients of the same management server 18. However, client 20 is running on an HP-UX platform, and is represented by display 28, and client 22 is running on a Windows 2000 platform and is represented by display 30. Pop-up menu 35 on display 28 includes a plurality of platform independent links 36 and several platform-dependent links 38.

Some configurations of client programs are written in JAVA and executed utilizing a JAVA virtual machine (JVM). In these configurations, platform independent links 36 cause JAVA code to be executed when selected, and do not require separate versions or modifications of the JAVA code for different operating system platforms. For example, the same JAVA code is used on both HP-UX and Windows 2000 platforms for platform independent links 36 "View" and "View in New Window," which control the display of tree 34 whether on GUI SAM client 20 or client 22. Similarly, platform independent links "Associate with Unknown Device . . . ," "Remove <host>," and "Delete <host>" result in messages being transmitted to management server 18 to perform these functions on the selected host (in this case, the host named "andante.rose.hp.com"). The links "Assign to Organization . . . ," "Remove from Organization," and "Move to Folder . . . " are other platform independent links, as are "Expand" and "Collapse."

On the other hand, platform dependent links 38 are links that utilize programs already resident on the client computer and that are not written in JAVA or executed by the JVM. Many such platform dependent links 38 will start a new process on the client computer. These links 38 require customization for each operating system supported by the SAM client software. Thus, "Host Telnet Release Notes," "Telnet" and "Ping" appear in the list of platform dependent links on display 28 of GUI SAM client 20, but "Ping" does not appear in the list of platform dependent links on display 30 of GUI SAM client 22. Moreover, telnet release notes are different for HP-UX than for Windows 2000, so a user clicking on the link "Host Telnet Release Notes" will view different notes, depending upon whether the user is at SAM client 20 or SAM client 22. These notes will be retrieved from a platform-dependent storage location. The "ping" command in the illustrated example is not available on the Windows 2000 platform on client 22 but is available on the HP-UX platform on client 20, so it does not appear on menu 35 of display 30 of GUI SAM client 22, but does appear on menu 35 of display 28 of GUI SAM client 20. The "telnet" command is available on both GUI SAM client 20 and 22, and so it appears on both displays 28 and 30, but because the client operating systems are different, the location of the "telnet" command differs between the two clients, as do the options provided to these commands. In some configurations of the present invention, only those platform dependent links 38 that are appropriate for the operating system platform on which the GUI SAM client 20 (or 22) runs are provided in menus 35.

More particularly in some configurations and referring to FIG. 4, when a user starts 110 GUI SAM client 20, client 20 creates 112 an Application Link object, or AppLink. (Although this example refers to client 20, the example reflects the actions of each instance of GUI SAM client, including GUI SAM client 22. This example assumes that the client is written in JAVA, but in other configurations, the client may be written in any other language for which virtual machines are available for the desired client operating systems and processors.) The AppLink object is a JAVA object that contains methods for launching various applications. In addition, client 20 also creates 114 a Device Property File Parser object, or DPFParser 115. This object parses a device property file ("specification file"), such as specification file 40 shown in FIG. 5. DPFParser object 115 includes a method 116 that queries the local JVM for "os.name," i.e., the name of the operating system, and a method 118 that sets a flag based on the results of the query. The operating system identification flag need only be set once, so for greatest efficiency, methods 116 and 118 are called at any time prior to or immediately upon the first launching of any platform specific application link. Specification file 40, which in some configurations of the present invention is provided with the client program, includes device management specifications 48 that can be parsed by GUI SAM client 20 to determine which application links are applicable for the platform on which client 20 is running, and which commands and arguments are used to launch these applications. In some configurations, specification file 40 also include comments 42 that are intended for a human reader, as well as information 44, 46 that can be read by GUI SAM client 20. In many configurations, specification file 40 provides specifications for each operating system platform for which the client program is supported.

When GUI SAM client 20 is activated, it establishes a communication link with management server 18. Client 18 exchanges data with management server 20 and receives information needed to produce display 28, for example and referring again to FIGS. 2 and 3, a displayed tree 34 of networked devices, a list 50 of network events, and a clickable display 52 of applications 54, 56, 58, 60, 62 that management server 20 provides. Referring to FIG. 6, when GUI SAM client 20 receives 120 a designated user initiated event (e.g., a right mouse click) applying to a SAN resource such as a host computer icon 32, the AppLink object uses 122 DPFParser to determine which platform specific application links or commands 38 to display in the pop-up menu that appears. For example, and referring to FIG. 5, platform independent application links or commands 36 are designated by the "OnManage" and "OnManageName" specifications 70 and 72, respectively. In this example, "OnManageName" specification 72 provides the command name that appears in the menu ("Host Telnet Release Notes"), and "OnManage" specification 70 provides the corresponding command (opening a browser window to a file at path/devices/properties/Host.html relative to a home directory). Platform specific application links or commands 38 are designated in sections "OnManage-<operating system designation>" 74 and "OnManageName-<operating system designation>" 76, where <operating system designation> is a parser-recognizable indication of the operating system platform to which that specification applies. In the example shown in FIG. 5, platform specific application links or commands 38 are provided for Windows, HP-UX, Solaris, and Linux operating systems. For Windows, Solaris, and Linux, only "Telnet" commands are provided, and the "Telnet" name is specified in the corresponding "OnManageName-<operating system designation>" specification 76. The corresponding "OnManage-<operating system designation>" 74 specified command, in the case of Windows, starts the Windows telnet.exe command within a command-line interpreter (cmd.exe) window, using the appropriate command line arguments, including the IP address of the host resource corresponding to the icon that was clicked. The Solaris and Linux commands are similar, but run their corresponding telnet commands in an "xterm" command line window. (Note that the paths to the "xterm" commands are different in Solaris and Linux.) When the telnet connection is opened, the user can log into the host computer and issue commands to the host.

A "telnet" application link is also provided for HP-UX, as is a "ping" application link. The semicolon separating their names in the "OnManageName-hpux" specification is used by the parser in this example to determine the presence of two names and two commands. The two commands are also separated by a semicolon in the "OnManage-hpux" specification. The presence of the ping application link allows the user to send packets to the selected host computer simply to determine whether the host computer is responding, and if so, how long it takes to obtain a response to each packet.

Thus, in some configurations and referring to FIG. 7, when a user selects an item from the pop-up menu, such as by left-clicking the menu item, GUI SAM client 20 receives 124 a select item event. In response to this event, an AppLink object of client 20 creates 126 an application link action handler (AppLinkActionHandler) object 128 to launch the selected command. AppLinkActionHandler 128 queries 130 DPFParser for the command macro (application link) in the OnManage specification that is associated with the selection event and the client operating system flag. The corresponding command macro or command is then executed 132 on the client.

Thus, the client program determines the operating system platform on which it is running and modifies its operation in accordance with that determination. This modification may include at least one modification to a user-selectable action on a user menu, such as a change that results in displaying and invoking an application appropriate for the client operating system that is stored at a location indicated by the specification file. The invoked application may, for example, be a "telnet" command that communicates with and issues commands to a remote computer, or a "ping" command, or another command that can be provided by user interaction with the client program. In some configurations, the modification to the operation of the client program includes displaying menu items applicable to the operating system platform determined by the client program.

In some configurations, the present invention comprises a management server program 18 running on a management server computer (either a host computer 12 or a separate computer) having instructions to communicate with devices such as host computers 12 in a storage area network 10. A plurality of client computers 200 are provided to run instances of a client program. Each client computer 200 has an operating system platform, but not all have the same operating system platform. Each client computer 200 also has a virtual machine (i.e., a language interpreter) that interprets the same language code (e.g., JAVA) as each other client computer, and a client program written in the virtual machine language that includes instructions to the client computer to communicate with the management server computer. The client program also provides instructions to determine the operating system platform of the client computer on which it is running and to modify the operation of the client program in accordance with that determination. A specification file is also provided in memory 206 of computer 200.

Although the example described above includes only platform specific application links for the computer on which the GUI SAM client is running, in some configurations, similar specifications are provided for commands that can be remotely executed on the remote host or interconnect device. In these configurations, additional flags and/or query methods are provided so that GUI SAM client is able to determine the operating system platform of the remote host, and/or a SAN management server is configured to provide this information.

Figure 8:
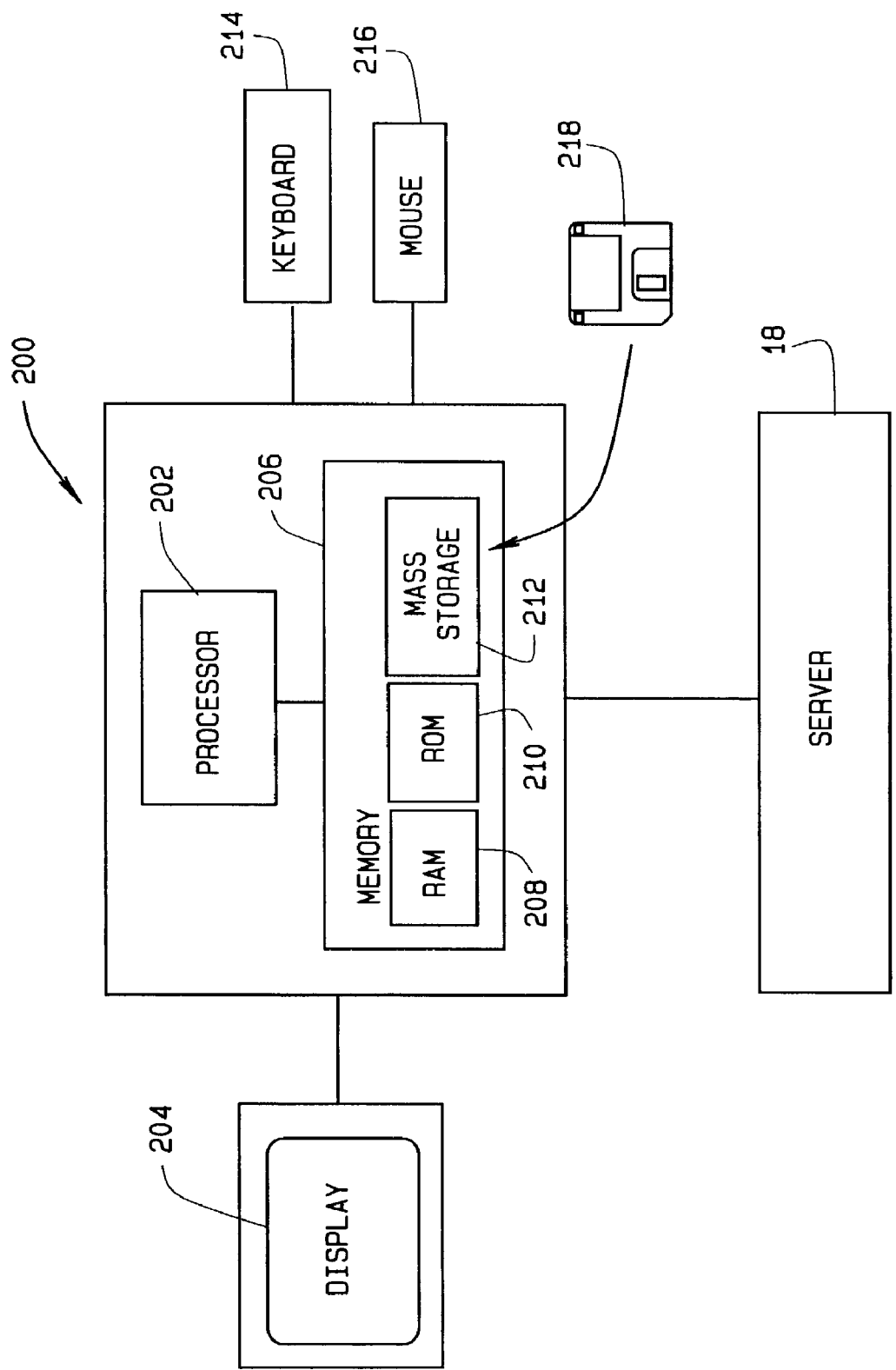
FIG. 8 is a block diagram of various client computer configurations of the present invention, also showing a communication link with a server computer.

In some configurations and referring to FIG. 8, client 20 is a process running on a computer 200 having a processor 202, a display screen 204, and memory 206, which may include random access memory (RAM) 208, read only memory (ROM) 210, and mass storage 212 such as a hard disk, a CD-ROM reader, a tape drive, a floppy disk drive, or other memory storage device with fixed media or capable of reading instructions and/or data from removable media 218. In some configurations, mass storage 212 may be provided remotely. For example, mass storage 212 may be part of or augmented by SAN 10, for example. User input devices such as a keyboard 214 and a mouse 216 are also provided. Client 20 and a virtual machine are provided in the form of machine readable instructions in memory 206 or on removable media 218 that are executed by processor 202. Some of these instructions instruct processor 202 to communicate with a server 18.

In some configurations, the client program is provided on a machine readable medium or media 218 having instructions recorded thereon to instruct processor 202 to perform one or more method configurations of the present invention.

It will thus be apparent that methods and apparatus of the present invention accommodate different command invocations on operating systems without relying upon the user to select the right choice for the client operating system. Furthermore, it will be apparent that methods and apparatus of the present invention provide scalability if there is a need to support additional operating systems, without crowding menus with commands that a user may never need or be able to use.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer having an operating system platform and a virtual machine configured to interpret an instruction language, said computer also having a client program written in said instruction language, the computer comprising:

a memory containing said client program said client program also having instructions written in said instruction language configured to determine said operating system platform and to modify the operation of said client program in accordance with said determination.

2. A computer in accordance with claim 1 wherein said client program includes instructions to communicate with a storage area network management server.

3. A computer in accordance with claim 2 wherein said client program includes instructions to read a specification file stored in said memory containing specifications for modifying the operation of said client program in accordance with said determination.

4. A computer in accordance with claim 3 wherein said computer further comprises a display, and said client program includes instructions for displaying a menu in response to user input, and said modification to the operation of said client program includes at least one modification to a platform dependent link or command on said menu.

5. A computer in accordance with claim 4 wherein said modification to at least one platform dependent link on said menu comprises launching an application stored at a location in memory indicated by said specification file for said determined operating system platform.

6. A computer in accordance with claim 5 wherein said application comprises a program to communicate with a remote computer.

7. A computer in accordance with claim 5 wherein said application comprises a program to issue commands to a remote computer.

8. A computer in accordance with claim 3 wherein said computer further comprises a display, and wherein said client program includes instructions for displaying a menu in response to user input, and said modification to the operation of said client program comprises displaying only menu items applicable to the determined operating system platform in said menu.

9. A management system comprising:

a management server computer having a management server program with instructions configured to instruct the management server computer to communicate with devices in a storage area network;

a plurality of client computers, each having an operating system platform but not all having the same operating system platform, wherein each client computer also has a virtual machine configured to interpret the same language code as each other said client computer, and a client program written in the virtual machine language and including instructions configured to instruct the client computer to communicate with said management server computer;

wherein said client program includes instructions to determine the operating system platform of its client computer and to modify the operation of the client program in accordance with said determination.

10. A management system in accordance with claim 9 wherein each said client computer has a specification file stored in a memory, and wherein said specification file contains specification for modifying the operation of the client program in accordance with said determination.

11. A management system in accordance with claim 10 wherein each said client program includes instructions for displaying a menu in response to user input, and said modification of said client program includes at least one modification to platform dependent link or command on said menu.

12. A management system in accordance with claim 11 wherein said modification to at least one platform dependent link or command on said menu comprises invoking an application stored at a location indicated by said specification file for said operating system platform.

13. A management system in accordance with claim 12 wherein said application comprises a program to communicate with a remote computer in the storage area network.

14. A management system in accordance with claim 13 wherein said application comprises a program to issue commands to a remote computer in the storage area network.

15. A management system in accordance with claim 10 wherein each said client program includes instructions for displaying a menu in response to user input, and said modification of said client program includes displaying only menu items applicable to the determined operating system platform in said menu.

16. A method for operating a computer having an operating system platform and a virtual machine configured to interpret an instruction language, the computer also having a client program written in the instruction language and having instructions to configure the processor to communicate with a server; said method comprising using the client program to determine the operating system platform and modifying operation of the client program in accordance with the determination.

17. A method in accordance with claim 16 further comprising using the client program to display information received from, and to execute commands on the server.

18. A method in accordance with claim 17 further comprising displaying a menu on a display of the computer in response to user input, and wherein said modifying the client program comprises reading a specification file stored in a memory of the computer and modifying at least one platform dependent command or link on the menu in accordance with contents of the specification file.

19. A method in accordance with claim 18 further comprising launching an application selected by the user from a memory location indicated by the specification file for the determined operating system.

20. A method in accordance with claim 19 wherein the application launched is a program to communicate with a remote computer.

21. A method in accordance with claim 19 wherein the application launched is a program to issue commands to a remote computer.

22. A method in accordance with claim 17 further comprising displaying a menu on a display of the computer in response to user input, and wherein said modifying the client program comprises reading a specification file stored in a memory of the computer and displaying only menu items applicable to the operating system, in accordance with contents of the specification file.

\* \* \* \* \*